United States Patent

Bolyn

[19]

[11] Patent Number: 5,907,863
[45] Date of Patent: May 25, 1999

[54] MEMORY CONTROL UNIT USING PRELOADED VALUES TO GENERATE OPTIMAL TIMING OF MEMORY CONTROL SEQUENCES BETWEEN DIFFERENT MEMORY SEGMENTS

[75] Inventor: Philip C. Bolyn, Norristown, Pa.

[73] Assignee: Unisys Corporation, Blue Bell, Pa.

[21] Appl. No.: 08/698,979

[22] Filed: Aug. 16, 1996

[51] Int. Cl.$^6$ .................................................. G06F 13/00
[52] U.S. Cl. ......................................... 711/167; 711/169
[58] Field of Search ..................................... 711/154, 156, 711/157, 167, 168, 169, 105, 106, 104

[56] References Cited

U.S. PATENT DOCUMENTS

| | | | |
|---|---|---|---|
| 4,055,851 | 10/1977 | Jenkins et al. | 711/167 |
| 5,193,165 | 3/1993 | Eikill et al. | 711/106 |
| 5,226,010 | 7/1993 | Glider et al. | 365/189.04 |
| 5,247,644 | 9/1993 | Johnson et al. | 711/157 |
| 5,265,231 | 11/1993 | Nuwayser | 711/106 |
| 5,463,756 | 10/1995 | Saito et al. | 711/167 |
| 5,548,787 | 8/1996 | Okamura | 395/845 |
| 5,615,355 | 3/1997 | Wagner | 711/167 |
| 5,732,236 | 3/1998 | Nguyen et al. | 711/151 |

*Primary Examiner*—Tod R. Swann
*Assistant Examiner*—Conley B. King, Jr.

*Attorney, Agent, or Firm*—John B. Sowell; Mark T. Starr; Steven B. Samuels

[57] ABSTRACT

A memory controller is described that comprises individual control segments for controlling memory that is divided into individual pairs of memory segments. The programmable memory controller provides improved average access times for memory devices by reducing the number of wait cycles between memory operations. A common data bus is shared between the memory segments. However, each control segment provides individual sets of address and control lines to each memory segment so that control sequences can occur simultaneously between multiple control and memory segments. Accordingly, when a control sequence is in process within one segment, another control sequence can occur simultaneously in another segment. By overlapping control sequences in this fashion, the bandwidth of the data bus is increased by remaining idle less frequently. Each control segment comprises a plurality of synchronous countdown register timers. Each countdown register is loaded with a programmable value at the beginning of a control sequence within its control segment. The programmable value is subsequently decremented by a value of one ('counts down') upon each pulse of a system clock. Each counter counts down to a value of zero and then holds that value until another memory sequence begins in the control segment. A value of zero within a counter indicates to the other control segment(s) that a particular control sequence therein can begin.

19 Claims, 5 Drawing Sheets

MEMORY CONTROL UNIT USING PRELOADED VALUES TO GENERATE OPTIMAL TIMING OF MEMORY CONTROL SEQUENCES BETWEEN DIFFERENT MEMORY SEGMENTS

CROSS-REFERENCE TO OTHER APPLICATIONS

The following application, filed concurrently herewith, is of common assignee and inventorship and contains some common disclosure:

"Memory Control Unit Providing Optimal Timing Of Memory Control Sequences Between Different Memory Segments By Optimally Selecting Among A Plurality Of Memory Requests", U.S. Ser. No. 08/698,001, file Aug. 16, 1996, Attorney Docket No. TN057 (1521.0120000), incorporated herein by reference in its entirety.

BACKGROUND OF THE INVENTION

1. Field of the Invention

The present invention relates generally to computer systems, and more particularly to memory controlling devices. Specifically, the present invention is directed toward a programmable memory controller that provides faster memory access rates by using pairs of memory segments and optimally controlling the timing sequences between the pairs of segments.

2. Related Art

The two most common types of semiconductor random access memories (RAMs) used in modern computer systems are static random access memory (SRAM), and dynamic random access memory (DRAM). Typically DRAMs are most often used when large amounts of memory are required, such as for an implementation of a computer system's primary storage. SRAMs are used most often when smaller amounts of memory are required and/or faster access rates are desired. For example, SRAMs are often used in computer systems as fast cache memory.

DRAMs are most often implemented when large amounts of memory are needed due to their lower costs and space requirements compared to SRAMs. However, the use of DRAMs require more complicated support circuitry than SRAMs. SRAMs store bits of data in an array of flip-flops. Once a bit is written in a SRAM, it remains there until it is either changed by another write sequence or energy is removed from the memory circuit.

DRAMs, on the other hand, store bits of data as charged capacitors. Because DRAMs are typically implemented using only a single transistor per bit of storage, they can be fabricated much more densely than SRAMs which typically require from 4–6 transistors per bit. However, because DRAMs store bits of data as charges, they are unstable because the charges leak off in a very short amount of time, usually within a few milliseconds. Thus, if DRAMs are not continuously attended to by a procedure known as 'refresh' they are subject to memory loss.

Refresh is accomplished by accessing the data within each cell in a DRAM. DRAM chips are generally organized in a matrix having rows and columns. In order to effectively perform refresh operations without taking an inordinate amount of time by continuously reading and writing to each cell every couple of milliseconds, DRAMs are organized so that an entire row may be refreshed during a single operation. This feature dramatically decreases the amount of time spent on refresh cycles.

Additionally, the row/column organization of DRAMs facilitates the use of fewer address lines that need to be connected to each DRAM chip. Each memory location within a DRAM is addressed by specifying a particular row address and a particular column address. The intersection of a row and column address identifies a specific memory location. By time multiplexing the row address and the column addresses, the same address lines can be used for both components of the address, thereby reducing the number of required address lines.

For example a DRAM chip that has a capacity of 64 Mbits may be arranged as a matrix comprising 8192 columns and 8192 rows. Generally, in order to address 64 Mbits of data using linear addressing techniques, 26 address lines are required. However, by time multiplexing the row and column address (i.e. by presenting the row address, followed by the column address), only 13 address lines are required.

In order to handle the refresh, address multiplexing, and other stringent control and timing requirements of DRAMS (discussed below), complex support circuitry is required. This is to be contrasted with the relatively simple support circuitry required by SRAMs. However, such complex support circuitry can be shared among large arrays of DRAMs making the additional cost less significant for systems that employ large memory arrays. Indeed, for systems that employ large memory arrays, the savings realized in both semiconductor real estate and lower memory costs generally outweigh the additional expense associated with the complex support circuitry.

Thus, computer system design engineers who wish to use DRAMs in their system designs must supply the required DRAM support circuitry. Generally, DRAM manufacturers provide specifications for each type of DRAM they produce. Such specifications comprise information needed to support each operating mode of the DRAM. Frequently, the specifications include timing diagrams comprising a plurality of digital waveforms. Each timing diagram depicts the control signals and their associated timings that are required to support each mode of operation of the DRAM. Typically, DRAMs support at least three modes of operation: a read, a write, and a refresh. A typical read cycle sequence can involve more than 20 timing parameters, all of which must be held within the specified limits to insure proper read operations. Write and refresh cycle timings are similarly complex.

The timing requirements, refresh requirements and the address multiplexing techniques used for DRAMs all tend to increase the access time. Typically, access times for the fastest commercial off the shelf (COTS) DRAMs commonly available today are in the range of 50–70 nano seconds (ns). This is to be contrasted with access times for the fastest COTS SRAMs, which are in range of 5–15 ns. The control timing requirements of DRAMs are partially responsible for their relatively long access times.

Such control timings are often the cause of undesirable wait cycles during and between memory access operations. Typically, a fixed period of time must elapse before and after a DRAM memory access operation. For example, pursuant to a DRAM read operation, several sequential events must occur before data is output on the data bus. This time period is referred to herein as the set-up time. Likewise, after a DRAM memory read operation has taken place, a fixed period of time must elapse before the DRAM is ready to accept another memory access command. This time period is referred to herein as the row address strobe (RAS) precharge time. Thus, using conventional methods, system data busses are not utilized to their optimal capacity when using DRAM devices. It is common for such data busses to sit idle for significant periods of time during and between memory access sequences.

SUMMARY OF THE INVENTION

Accordingly, the present invention is directed toward a programmable memory controller that provides improved average access times for memory devices by reducing the number of wait cycles between memory operations. Memory is divided into a pairs of memory segments. A common data bus is shared between the memory segments, but each segment is provided with individual sets of address and control lines. Thus, when a control sequence is in process within one segment, another control sequence can occur simultaneously within the second segment. By overlapping control sequences in this fashion the shared data bus can be used by the second segment as soon as it is released by the first segment. This increases the bandwidth of the common data bus by decreasing the amount of time the data bus remains idle.

Individual control logic is provided for each memory segment (hereinafter referred to as 'control segments'). Each control segment provides individual sets of control and address lines to each memory segment. Further, each control segment includes a set of synchronous countdown register timers (also referred to as 'counters' and 'allow mode registers'). Each countdown register is loaded with a programmable value at the beginning of a control sequence within its associated memory segment (hereinafter referred to as the 'local' segment). The programmable value is subsequently decremented by a value of one ('counts down') upon each pulse of a system clock. Each counter counts down to a value of zero and then holds that value until another memory sequence begins in the local segment, and another programmable value is loaded into the countdown register. A value of zero within a counter indicates to the other control segment that a particular control sequence can begin therein.

Thus, each control segment has a set of associated countdown timers that are loaded with a programmable value at the beginning of a control sequence within the control segment. A value of zero within any countdown timer indicates to the other segment that it may begin a control sequence. Each countdown register is loaded with a programmable value that is associated with the particular type of control sequence being initiated in the local segment. Further, each countdown register represents to the other segment, a particular type of control sequence that can begin therein. Thus, each countdown register within each control segment represents an 'allow sequence' signal to the other control segment. When the countdown register counts down to zero, a particular control sequence associated with the countdown register may begin in the other control segment.

As stated, whenever a control sequence begins within a control segment, each countdown register within the control segment is loaded with a programmable value. The programmable value loaded into each countdown register is selected from among a plurality of programmable values coupled with each countdown register. Each programmable value represents the number of clock cycles in which the other control segment must wait before beginning the particular control sequence that is associated with the countdown register.

For example, a typical DRAM memory controller performs three modes of operations, namely a read, a write and a refresh. Therefore, using this example, three countdown registers each representing an allow signal, (an allow read, an allow write and an allow refresh) are provided for each control segment. Each countdown register is loaded with a programmable value at the beginning of a control sequence within its local segment. However, each countdown register maintained by one segment is used by the other segment to determine when a particular control sequence is allowed to begin therein. For example, anytime an allow read countdown register in one segment contains the value of zero, a read sequence can begin in the other segment. Similarly, anytime an allow write countdown register in one segment reaches zero, a write sequence can begin in the other segment. Finally, anytime an allow refresh countdown register in one segment contains the value of zero, a refresh sequence can begin in the other segment.

The programmable value that is loaded into each allow mode countdown register depends upon the type of control sequence that is being started in the local control segment. Using the example above for a typical DRAM device, suppose a write sequence is being started in the local segment. In this case, each allow mode countdown register within the local segment is loaded with a particular programmable value that is related to the write sequence. For example, the programmable value loaded in the allow read countdown register is the write sequence to read sequence value. Similarly the value loaded into the allow write countdown register is the write sequence to write sequence value. Finally the value that is loaded into the allow refresh countdown register is the write sequence to refresh sequence value.

Each programmable value represents the number of clock pulses which must elapse before the other segment can begin its control sequence. For example, suppose the write to read sequence value loaded into the allow read register is the number 7. This indicates that 7 clock pluses must elapse after the beginning of a write sequence in one segment, before a read sequence can begin in the other segment. Similarly, the read to read sequence value loaded into the allow read countdown register indicates the number of clock pulses that must elapse after the beginning of a read sequence in one segment, before a read sequence can begin in another segment. Likewise, the refresh to read sequence value loaded into the allow read countdown register indicates the number of clock pulses that must elapse after the beginning of a refresh sequence in one segment, before a read sequence can begin in another segment. The other two mode countdown registers, namely the allow write and the allow refresh registers function in a similar fashion.

The selection of which value to load into each allow mode countdown register is accomplished with the use of a multiplexer device coupled with each allow mode register. Control logic is coupled with each multiplexer device which selects one of the plurality of pre-programmed values to be loaded each time a control sequence begins in the local segment. The programmable value selected depends upon the type of control sequence that is being started.

Such programmable values are typically determined by examining the specifications for a particular memory device that is being used with an implementation of the present invention. Once such values are determined they are programmed into an embodiment of the present invention and typically remain constant for a particular use. Timing diagrams and the like can be used to determine such programmable values. Optimal programmable values are selected so that simultaneous control sequences can occur in the two memory segments without having data from the two segments interfere with one another on the shared data bus. In addition, optimal programmable values are selected so that the bandwidth of the shared data bus in increased as much as possible by reducing the periods of time that the data bus remains idle between memory sequences.

In addition, to facilitate the optimization of the memory control sequences among each segment, memory addresses are interleaved between each pair of memory segments. For example, all even address locations may be contained in one memory segment and all of the odd locations may be contained in the other memory segment. By interleaving the addressess locations in this fashion, it becomes more likely that a memory request within one memory segment will be pending while a memory operation is taking place in the other memory segment.

BRIEF DESCRIPTION OF THE FIGURES

The present invention will be described with reference to the accompanying drawings, wherein.

In the drawings, like reference numbers generally indicate identical, functionally similar, and/or structurally similar elements. The drawing in which an element first appears is indicated by the leftmost digit(s) in the reference number.

DETAILED DESCRIPTION OF THE PREFERRED EMBODIMENTS

The present invention is directed toward a programmable memory controller that provides improved average access time for memory devices by reducing the number of wait cycles between memory operations. Each block of memory is divided into two segments sharing a common data bus. Each segment has its own individual sets of address and control lines. The control sequences between segments are overlapped so that a shared data bus can be used by one segment immediately after it is released from use by the other segment. This increases the bandwidth of the shared data bus by decreasing the amount of time the data bus remains idle between control sequences.

The examples provided herein describe a preferred embodiment of the present invention as it relates to the control of a DRAM device. However, an embodiment of the present invention may be implemented with any type of memory device that can be arranged in multiple segments, including without limitation, static random access memory (SRAM), video memory (VRAM), three-dimensional random access memory (3DDRAM), synchronous dynamic random access memory (SDRAM), Windows random access memory (WRAM), Cache DRAM, Mulitbank DRAM, and other memory devices not yet conceived.

Figure 1:
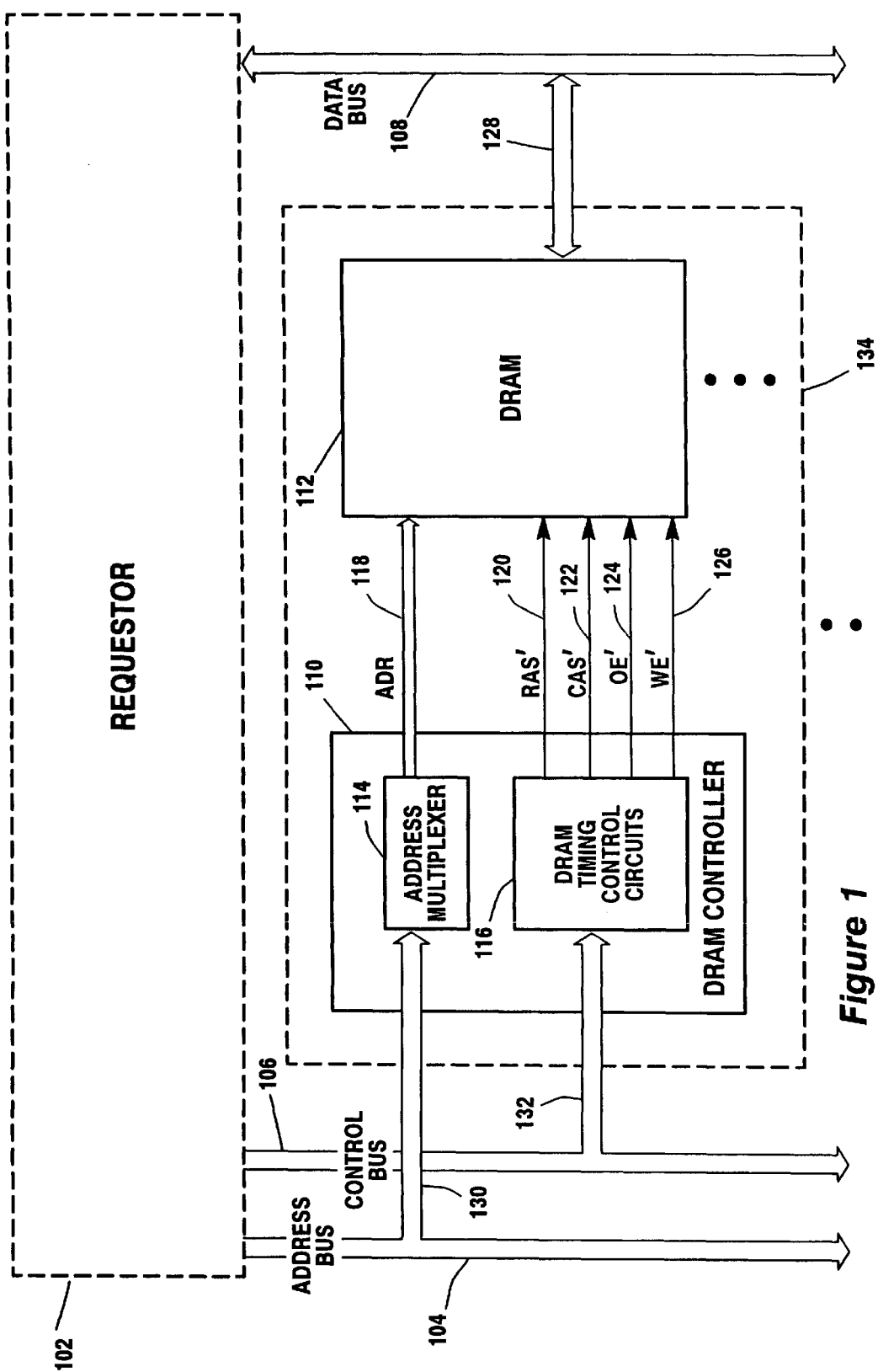
FIG. 1 is a block diagram depicting a typical prior art bus operating environment for the present invention.

FIG. 1 is a block diagram depicting a typical operating environment for the present invention. FIG. 1. shows a requestor 102, a DRAM controller 110 and a DRAM 112. The requestor 102 can be any device that can interface with the DRAM controller 110 and request memory read and write operations therefrom. Such examples of requestors are central processing units (CPUs), direct memory access (DMA) devices, second level cache devices and input/output (I/O) channel devices. Further the requester depicted as the block 102 can represent one or a plurality of requestors. The requestor 102 comprises a control bus 104, an address bus 106 and a data bus 108. The DRAM controller acts as an interface between the DRAM 112 and the requestor 102. Note that as depicted in FIG. 1, a plurality of DRAMs 112 can be coupled with a single DRAM controller 110. Also note that a plurality of the DRAM controller/DRAM combinations 134, may be coupled with the requestor 102 via the address bus 104, the control bus 106 and the data bus 108, as shown.

Each DRAM controller 110 comprises two components: an address multiplexer 114 and a DRAM timing control circuit 116. The address multiplexer 114 is coupled with the requestor's address bus 104 via the address bus 130. The address multiplexer 114 typically converts an address originating from the requestor 102, into a time-multiplexed row and column address required by the DRAM 112. The time-multiplexed row and column address are sent to the DRAM 112 via the address bus 118.

Note that as previously stated, the address bus 118 required for DRAMs is typically at most, half as wide as the requestor's address bus 104 and the DRAM input address bus 130. For example, a typical implementation of a computer system having 64 Mbytes of DRAM, generally requires an address bus that is at least 26 bits wide. That is, a minimum of 26 binary digits are required to represent 65,536,000 individual address locations. In some implementations additional address lines are also used for controlling DRAMs. For example, in systems that employ particularly large memory arrays, additional address lines are used to select between a plurality of DRAM blocks, where each block contains 64 Mbytes of DRAM. For example, 3 address lines can be added to select between a maximum of 8 such blocks. Thus, in this example, the address busses 104 and 130 would be 29 bits wide.

However, still only 13 lines are required for the address bus 118 when using the previously described time-multiplexing technique. Thus, in this example, the address bus 118 would be 13 bits wide, while address busses 130 and 104 would be 29 bits wide. This savings is considerable when considering that a single DRAM controller 110 typically controls a plurality of DRAM chips 112.

Memory read and memory write requests are made by the requestor 102 via the control bus 106. The DRAM controller 110 responds to such requests by generating the appropriate control signals and the appropriate timings for such control signals to the DRAM 112. The data pertaining to a memory write is sent from the requestor 102 to the DRAM 112 via the bidirectional data busses 108 and 128 respectively. Likewise the data pertaining to the memory read is sent from the DRAM 112 to the requestor 102 via the bidirectional data busses 128 and 108, respectively. Generally, the DRAM controller 110 also controls and generates periodic refresh cycles as required by the DRAM 112. Arbitration between read and write requests and such refresh operations are also typically managed by the DRAM controller 110.

Figure 2:
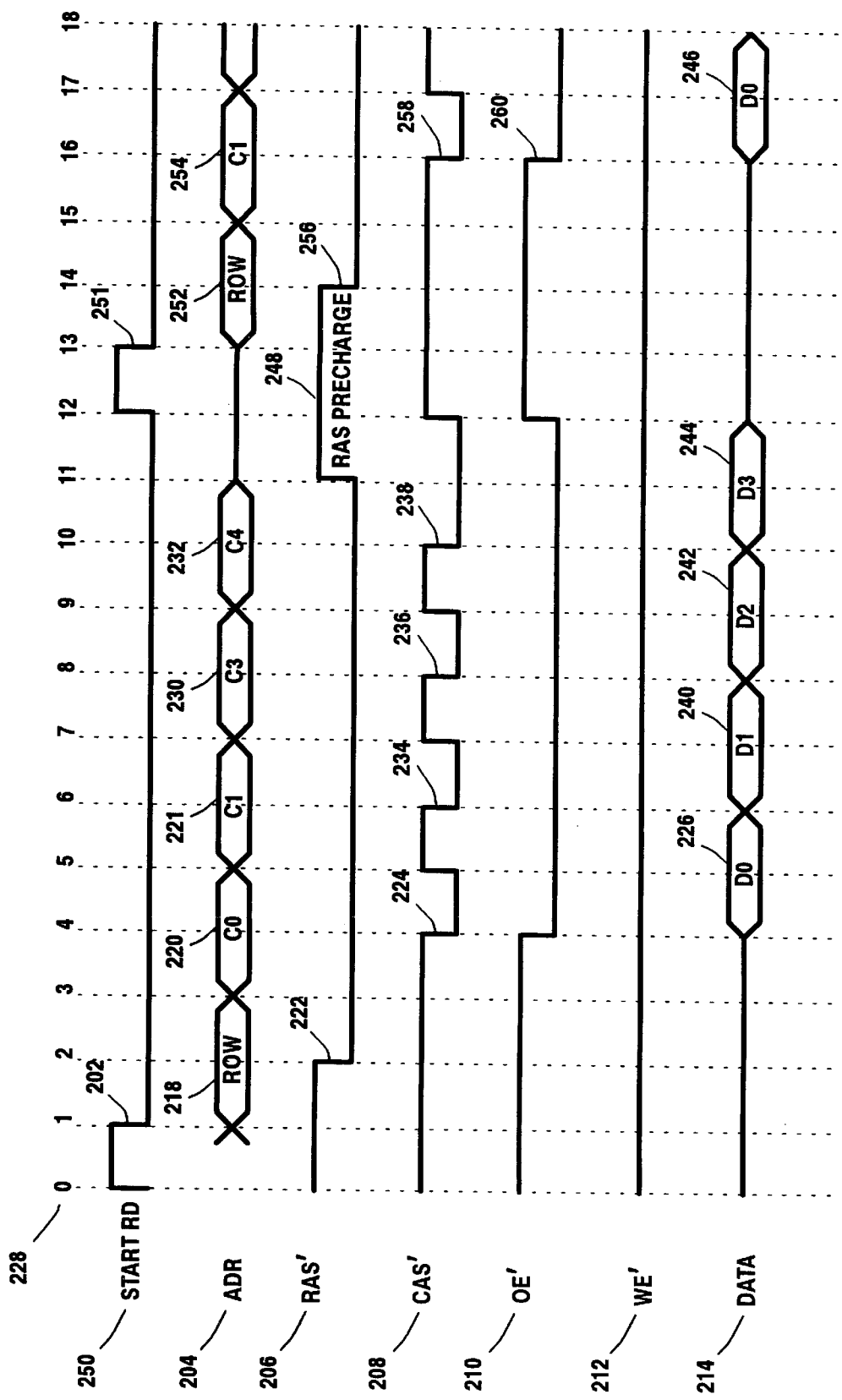
FIG. 2 is a typical timing diagram depicting two prior art type sequential read sequences for a DRAM device shown in FIG. 1.

The output signals from the DRAM controller 110, specifically the signals on the address bus 118, the RAS' line 120, the CAS' line 122, the OE' line 124 and the WE' line 126, will be described with reference to the timing diagram in FIG. 2. The timing diagram in FIG. 2 depicts timing relationships for a typical DRAM read operation. In this case, the read operation depicted is a four-word page mode read request. This is a common type of read request supported for example, by COTS extended data out (EDO) DRAMS. In this mode of operation, four words of data which are stored within a common row are accessed by specifying a single row address followed by four successive column addressess. The single row address, coupled with each of the four column addresses comprises four distinct row/column addresses. Because the row address is only specified once, the sequence time to read four words of data is substantially decreased.

Note that the timing diagram in FIG. 2 is used to show typical requirements related to the control line interrelationships and the types of timing constraints generally provided by memory controlling devices. Other modes of operation, such as write or refresh modes could have been used to convey the principles depicted herein. Accordingly, the read operation used throughout the instant disclosure is used as an example in order to distinctly point out the features and functions provided by a preferred embodiment of the present invention. The same principles apply to other modes of operation such as different types of read modes, write modes and refresh modes.

The timing diagram depicted in FIG. 2 is a typical timing diagram displaying nominal timings and relationships for the control signals for a DRAM device. The control signals are depicted as horizontal waveforms and are labeled at the beginning of each waveform, on the left side of the timing diagram. The numbers across the top of the timing diagram are time reference points that represent successive system clock pulses 228. In this example, 19 clock pulses are depicted that range from clock pulse 0 to clock pulse 18 (see the numbers to the right of the reference numeral 228). Note that when a particular clock pulse is referenced herein, it is hereinafter referred to as clock pulse 228-n, where n represents one of the numbers, 0–14, as depicted across the top row of the timing diagram 228. For example, the transition 222 of the RAS' waveform 206 occurs at the clock pulse 228-2. Note that the "'" symbol at the end of a waveform signal name, such as RAS' 206, indicates that the associated signal is active upon a low logic level.

The timing relationships required for a typical DRAM will now be described. A read sequence begins when the start read signal 250 transitions from a high to a low logic level 202. The DRAM 112 latches the row address 218 upon the falling edge of the row address strobe (RAS') 222. Thus, during the clock pulse 228-2, when the DRAM controller 110 generates the falling edge 222 of the RAS' signal 206, the address multiplexer 114 must contemporaneously supply the DRAM 112 with the appropriate row address 218, corresponding with the read request generated by the requester 102. The row address 218 is transmitted to the DRAM over the address bus 118.

Typically the row address 218 is a translated output originating from the address multiplexer 114 of the DRAM controller 110. As previously stated, the address multiplexer 114 translates an address that comprises the full width of the address busses 104 and 130. Each full length address is translated into separate row and column address, which are time multiplexed to the DRAM chips 112, as can be seen by the row and column address signals 218 and 220, 221. Note that as previously stated, each row and column address comprises the width of the smaller address bus 118. This method of row/column addressing reduces the number of address lines (typically by half) attached to each DRAM chip. The larger address busses 130 are attached only to each of the DRAM controller chips 110, which are typically much less plentiful than the plurality of DRAM chips comprising a typical computer system having large memory arrays.

Referring back to FIG. 2, the next event occurs at the clock pulse 228-4. At clock pulse 228-4, the column address strobe (CAS') 208 transitions to a low logic level 224. This event causes the DRAM 112 to latch-in the column address 220 via the address-bus 118. Thus, during the clock pulse 228-4, when the DRAM controller 110 generates the falling edge 224 of the CAS' signal 206, the address multiplexer 114 must contemporaneously supply the DRAM 112 with a valid column address 220, corresponding with the requestor's 102 read request.

At the same time, during clock pulse 228-4, the output enable (OE') signal 210 transitions to a low logic state 246, causing the DRAM 112 to turn on its output drivers. Consequently, the data stored in the memory location identified by the row/column addresses 218/220 now appears on the data bus 128. Thus, the data DO 226 is now available for the requester 102 to read via the data bus 108.

Next, at the clock pulse 228-6, the CAS' signal 208 once again goes low at 234. This causes the DRAM 112 to latch-in the second column address 228. At this time the OE' signal 210 remains low and the DRAM turns on its output drivers. This causes the data stored in the memory location identified by the row/column address 218/228 to appear on the data bus 128. At this point the data D1 240 is available for the requestor 102 to read via the data bus 108.

Next, at the clock pulse 228-8, the CAS' signal 208 goes low at 234, causing the DRAM 112 to latch-in the column address 230. At this time the OE' signal 210 remains low and the DRAM turns on its output drivers so that data from the row/column address 218/230 is output to the data bus 128. At this point the data D2 242 is available for the requestor 102 to read via the data bus 108.

Finally, at the clock pulse 228-10, the CAS' signal 234 goes low, causing the DRAM 112 to latch-in the column address 232. At this time the OE' signal 210 remains low and the DRAM turns on its output drivers so that data from the row/column address 218/232 is output to the data bus 128. At this point the data D3 244 is available for the requester 102 to read via the data bus 108. Note a read operation is depicted in FIG. 2; the write enable (WE') signal 212 remains high throughout the entire read sequence.

Immediately following this four-word page read sequence, a second read sequence is depicted in FIG. 2. The second read sequence cannot be started immediately after the completion of the first read sequence due to a DRAM constraint known as RAS precharge 248. RAS precharge is a time period required to precharge the dynamic circuitry in typical DRAM devices in preparation for the next memory cycle. In this example, RAS precharge 248 is 3 clock cycles long and occurs during the clock pulses 228-11 through 228-14. Different DRAM devices may specify different time periods required for the RAS precharge time.

In this example, the earliest time period in which a subsequent read cycle may begin is during the clock pulse 228-12 to compensate for the RAS precharge 248 time period requirement. Thus, a second read sequence begins when the start read signal 250 transitions from a high to a low logic level 251 at the clock pulse 228-13. The second read sequence functions in the same manner as the first read sequence as described above. Thus, the new row address 250 is latched into the DRAM 112 upon the falling edge 256 of the RAS' signal 206. Similarly, the new column address 252 is latched into the DRAM device 112 upon the failing edge 258 of the CAS' signal 208. Finally, at the same time the OE' signal 210 transitions to low at 260, causing the DRAM 112 to turn on its output drivers so that data from the row/column address 252/254 is output to the data bus 214 at 108.

Note that the data bus 214 remains idle for 4 clock pulses (from 228-12 through 228-16) at 246 between the preceding successive read operations. This phenomenon of idle data bus periods generally occurs with other modes of DRAM operations as well, such as write and refresh cycles. This is due to the required set-up time and the RAS precharge time, as previously described. In addition, idle data bus periods may occur with other types of memory devices. Note that for a typical system which operates at a system clock speed of 50 Megahertz, each clock pulse 228 represents an elapsed time of 20 nanoseconds (ns.). Thus in this case, the data bus is idle for 80 ns between two successive read operations.

Figure 3:
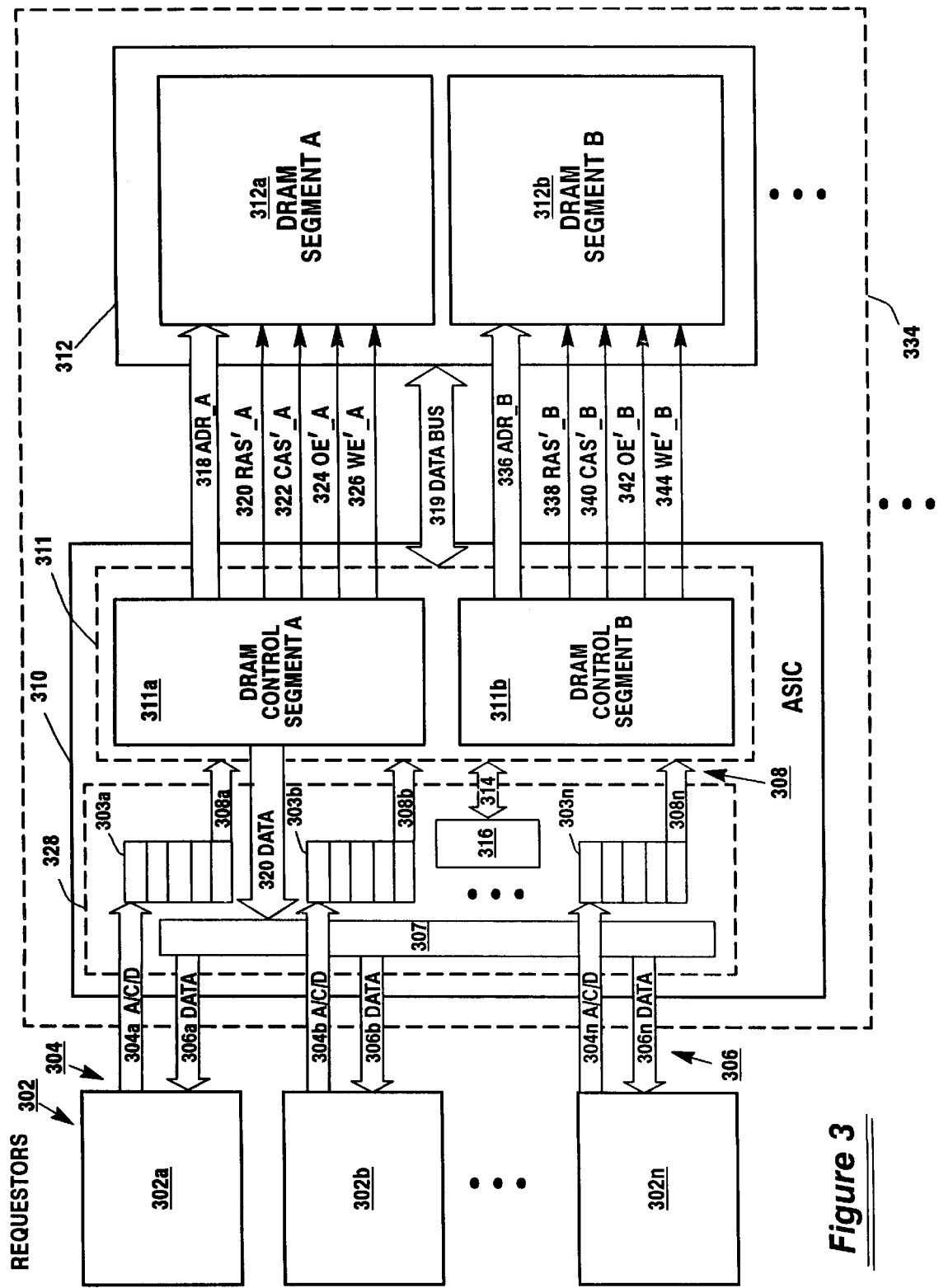
FIG. 3 is a block diagram depicting a typical operating environment including a preferred embodiment of the present invention.

FIG. 3 is a block diagram depicting a typical operating environment including a preferred embodiment of the present invention. A preferred embodiment of the present invention is implemented using an application specific integrated circuit (ASIC) device. Accordingly, this example refers to a preferred embodiment of the present invention as the ASIC 310. The ASIC 310 acts as an interface between the DRAM 312 and a plurality of requestors 302a, 302b, ..., and 302n (generally 302). The DRAM 312 is divided into two segments, 312a and 312b (generally 312). Note that as depicted in FIG. 3, a plurality of DRAMs 312 can be coupled with a single ASIC 310. Also note that a plurality of such combinations 334 of DRAM controller/DRAMs may be coupled with each of the plurality of the requesters 302.

The ASIC 310 includes two components referred to herein as the interface controller 328 and the DRAM controller 311. The DRAM controller 311 comprises a pair of complementary control segments 311a and 311b (generally 311). Each control segment 311 controls one DRAM segment 312. Accordingly, the control segment 311a provides control signals to the DRAM segment 312a and the control segment 311b provides control signals to the DRAM segment 312b. The interface controller 328 provides an interface between the plurality of requestors 302 and the DRAM controller 311. The functions provided by each of the components 328 and 311 will be described below.

The DRAM controller 311 provides the DRAM 312 with address and control signals. Each control segment 311a and 311b is coupled with each DRAM segment 312a and 312b, via individual sets of address and control lines. For example, the control segment 311a is coupled with DRAM segment 312a via the address lines ADR_A 318. Similarly, the control segment 311a is coupled with the DRAM segment 312a via the control lines RAS'_A 320, CAS'_A 322, OE'_A 324, and WE'_A 326. Likewise, the control segment 311b is coupled with DRAM segment 312b via the address lines ADR_B 336. In addition, the control segment 311b is coupled with the DRAM segment 312b via the control lines RAS'_B 338, CAS'_B 340, OE'_B 342, and WE'_B 344.

A bidirectional data bus 319 is shared between the complementary pair of DRAM segments 312a and 312b. Thus, data is transmitted along the data bus 319 in the direction from the DRAM 312 to the DRAM controller 311 during the processing of a read request from a requestor 302. Similarly, data is transmitted along the data bus 319 in the direction from the DRAM controller 311 to the DRAM 312 during a the processing of write request from a requestor 302.

The interface controller 328 provides an interface between the plurality of requesters 302 and the DRAM controller 311. Each requestor 302 is coupled with the interface controller via two unidirectional buses, as depicted by the buses 304a, 304b, ..., and 304n (generally 304), and 306a, 306b, ..., and 306n (generally 306). The first unidirectional bus 304 transmits address, control and data signals from the requestors 302 to individual request queues within the interface controller 328. The individual request queues, 303a, 303b, ..., and 303n (generally 303), store a plurality of requests from the requestors 302. Such requests are subsequently transfered from the request queues 303 to the DRAM controller 311 via the request queue outputs 308a, 308b, ..., and 308n (generally 308). Various techniques and methods may be used to determine the priority and order in which the pending requests are processed by the DRAM controller 311. An example of such a technique is disclosed in the aforementioned cross-referenced application.

The second unidirectional bus as depicted by the bus 306 transmits data from a data storage area 307 within the interface controller 328 to the requesters 302. Other functions are typically provided by the interface controller 310. For example, the interface controller typically provides control for the periodic refresh cycles required by the DRAM 312. In addition, arbitration between pending read, write and refresh requests is typically managed by the interface controller 328. These and other functions are represented by the logic control block 316 and the bidirectional signal bus 314.

Figure 4:
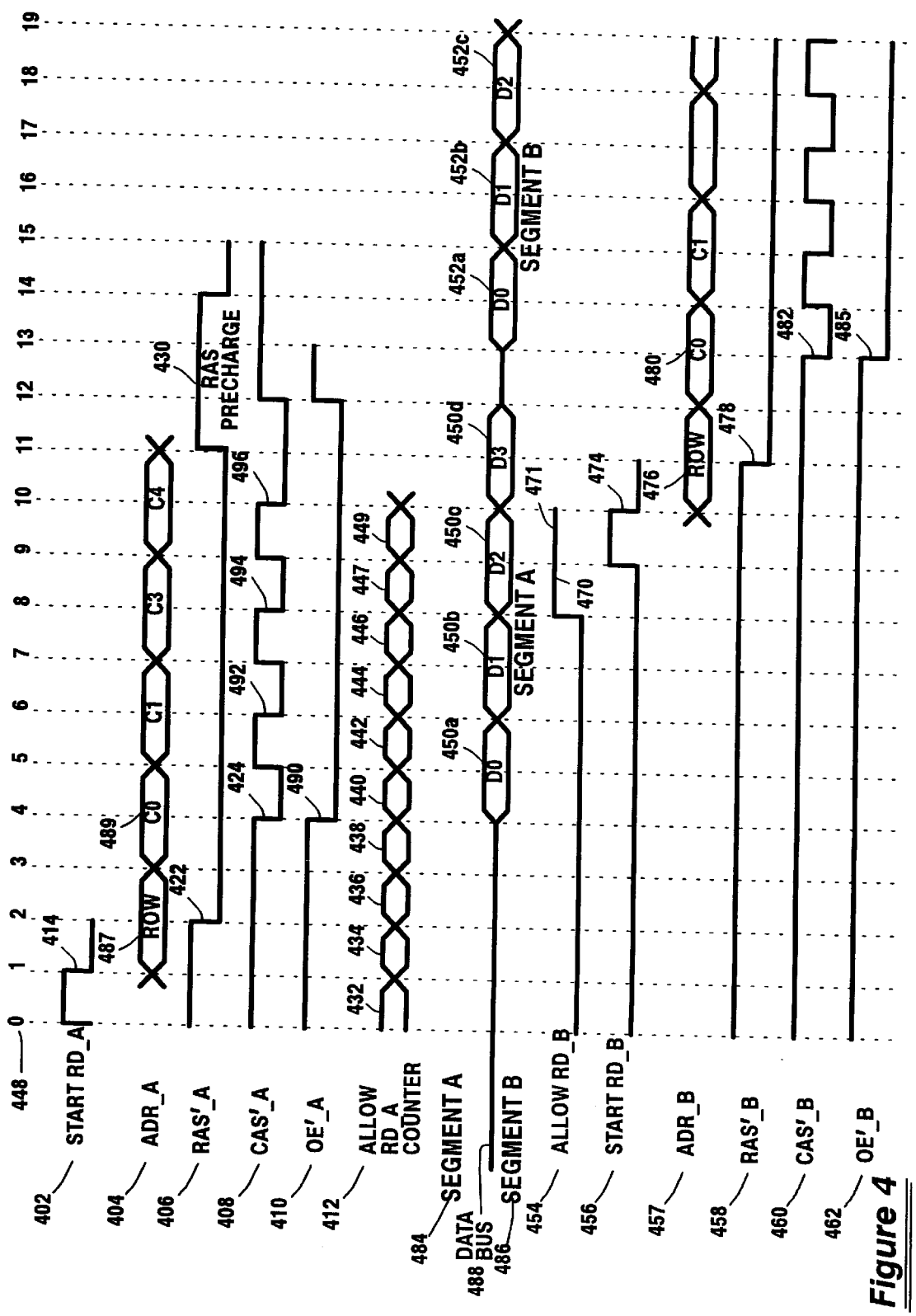
FIG. 4 is a typical timing diagram depicting a 2 simultaneous read control sequences for a DRAM device according to an implementation of the present invention.

The control signals generated by an embodiment of the present invention as depicted in FIG. 3 will now be described with reference to the timing diagram in FIG. 4. Note that the timing diagram depicted in FIG. 4 is a read control sequence that is similar to the read control sequence as previously described and depicted in FIG. 2. The timing specifications for both read control sequences as depicted in FIGS. 2 and 4, are the same. However, FIG. 2 depicts two successive read sequences from a single DRAM and FIG. 4 depicts two successive and overlapping read sequences for two DRAM segments 312a and 312b according to an embodiment of the present invention.

Accordingly, the timing diagram in FIG. 4 is divided into two sections. The top section 'Segment A' 484 represents the signals generated by the control segment 311a. Likewise, the bottom section 'Segment B' 486 represents the signals generated by the control segment 311b. Accordingly the signals ADR_A 404, RAS'_A 406, CAS'_A 408 and OE_'A 410 correspond with the control segment 311a control lines ADR_A 318, RAS'_A 320, CAS'_A 322 and OE'_A 324 respectively. Similarly, the signals ADR_B 457, RAS'_B 458, CAS'_B 460 and OE_'B 462 correspond with the control segment 311b ontrol lines ADR_B 336, RAS'_B 338, CAS'_B 340 and OE'_B 342 respectively. Note that the signals that correspond with the control lines WE'_A 326 and WE_B 344 are not depicted in FIG. 4 and are assumed to be in the high logic state throughout these read sequences.

The signals associated with the shared data bus 308 is depicted in FIG. 4 as the data bus signal 488 located between the read sequences for segments A 484 and B 486. Further, as indicated, the first set of data words DO 450a, D1 450b, D2 450c and D3 450d are associated with the control sequence from segment A 484. Likewise, the second set of data words DO 452a, D1 452b, D2 452c and D3 (not shown) are associated with the control sequence from segment B 486.

The read sequence for the Segment A 484 begins with the Start Rd__A signal 402. Upon the falling edge of the Start Rd__A signal 402, the DRAM controller 310 generates a row address 486 on the ADR__A 318 as depicted by the ADR__A signal 404. The row address 487 is latched into the DRAM Segment 312a upon the falling edge 422 of the RAS'__A control signal 406. The column address 489 is latched into the DRAM Segment 312a, upon the falling edge 424 of the CAS__A signal 408. At the same time, upon the falling edge 490 of the OE'__A signal 410, the DRAM Segment 312a turns on its output drivers causing a word of data to appear on the data bus 308, as depicted by data word 450a on the data bus signal 488. The other data words 450b, 450b and 450c appear on the data bus 308 in a similar fashion in response to the subsequent column addressess upon the subsequent falling edges 492, 494, and 496 of the CAS'__A signal 408.

At the beginning of this read sequence (as depicted by the falling edge of the Start__Rd__A signal 414), an allow read counter (described below) is loaded with a programmable value. The allow read counter resides within the control segment 311a and will be described in detail below. This contents of the allow read counter at any time, is illustrated in FIG. 4 by a numeric value associated with the Allow Rd__A counter signal 412. Thus, the programmable value 434 that is loaded at the beginning of the start read sequence 414 is the value '7' 434. This value represents the minimum number of clock cycles that must elapse between the start of a read sequence in Segment A 484 and a similar read sequence in Segment B 486.

As previously stated and as will be discussed in further detail below, each allow mode counter is loaded with a programmable value at the beginning of a control sequence within its local control segment 311. The programmable value is subsequently decremented by a value of one (i.e. it 'counts down') upon each pulse of the system clock (each pulse of the system clock is represented by the clock pulses 448-0 through 448-18). Each counter counts down to a value of zero and then holds that value until another memory sequence begins in the local segment. At that time, a new programmable value to be loaded into the countdown register. A value of zero within a counter in one segment indicates to the other segment that a particular control sequence begins therein.

Thus, a programmable value of '7' 434 is loaded in the allow read counter within the control segment 311 a at the beginning of the read sequence for Segment A 484. Next upon each subsequent pulse of the system clock (448-2 through 448-8), the value within the allow read counter is decremented by 1, as shown by the values '6' 436, '5' 438, '4' 440, '3' 442, '2' 444, '1 ' 446, and '0' 448. Once a value of '0' 448 is reached, the allow read counter holds that value 449 until a new value is loaded (not shown).

The control logic for Segment B 311b uses the Allow Rd__A counter signal 412 to determine when a read sequence may begin within the Segment B 486. Accordingly, whenever the Allow Rd__A counter contains a value of '0', a read sequence can begin in Segment B. This is depicted by the Allow Rd__B signal 486 which is derived from the Allow Rd__A counter 412. Thus, wherever the Allow Rd__A counter 412 contains a '0' (432, 447 and 449), the Allow Rd__B signal 454 is at a high logic state (464 and 470 and 471). Likewise, wherever the Allow Rd__A counter signal 412 contains a value other than '0' (434-446), the Allow Rd__B signal 454 is at a low logic state 468.

Accordingly, the control segment 311b monitors the Allow Rd__B signal 486 to determine when a read sequence is allowed to begin therein. If a read sequence is pending for the DRAM Segment 312b, such sequence can begin only if the Allow Rd__B signal 454 is at a high logic state (such as 470). Thus, as can be seen by the Start Rd__B signal 456, A read sequence begins at the clock pulse 448-9 as depicted by the low to high transition 472 of the Start Rd__B signal 456.

Thus, at the falling edge 474 of the Start Rd__B signal 456, the control segment 311b generates a row address 476. The row address 476 is latched into the DRAM segment B 312 during the falling edge 478 of the RAS'__B signal 458. The column address 480 is latched into the DRAM Segment 312b upon the falling edge 482 of the CAS'__B signal 460. At the same time, during the falling edge 488 of the OE'__B signal 462, the DRAM Segment 312b turns on its output drivers causing a word of data to appear on the data bus 308, as depicted by data word 452a on the data bus signal 488. The other data words 452b, 452c and 450d (not shown) appear on the data bus 308 in a similar fashion in response to the subsequent column addressess and falling edges of the CAS'__B signal 460.

As stated, the timing specifications and control logic for each of the control sequences depicted for Segment A 484 and Segment B 486 are the same as was previously described with respect to the read sequence in FIG. 2. Note however, that by overlapping the read sequence for Segment A 484 and Segment B 486, the data bus 488 is idle only for one clock cycle 484. This is to be contrasted with the data bus 214 in FIG. 2, which remains idle for 4 clock cycles between the successive read sequences as previously discussed.

Figure 5:
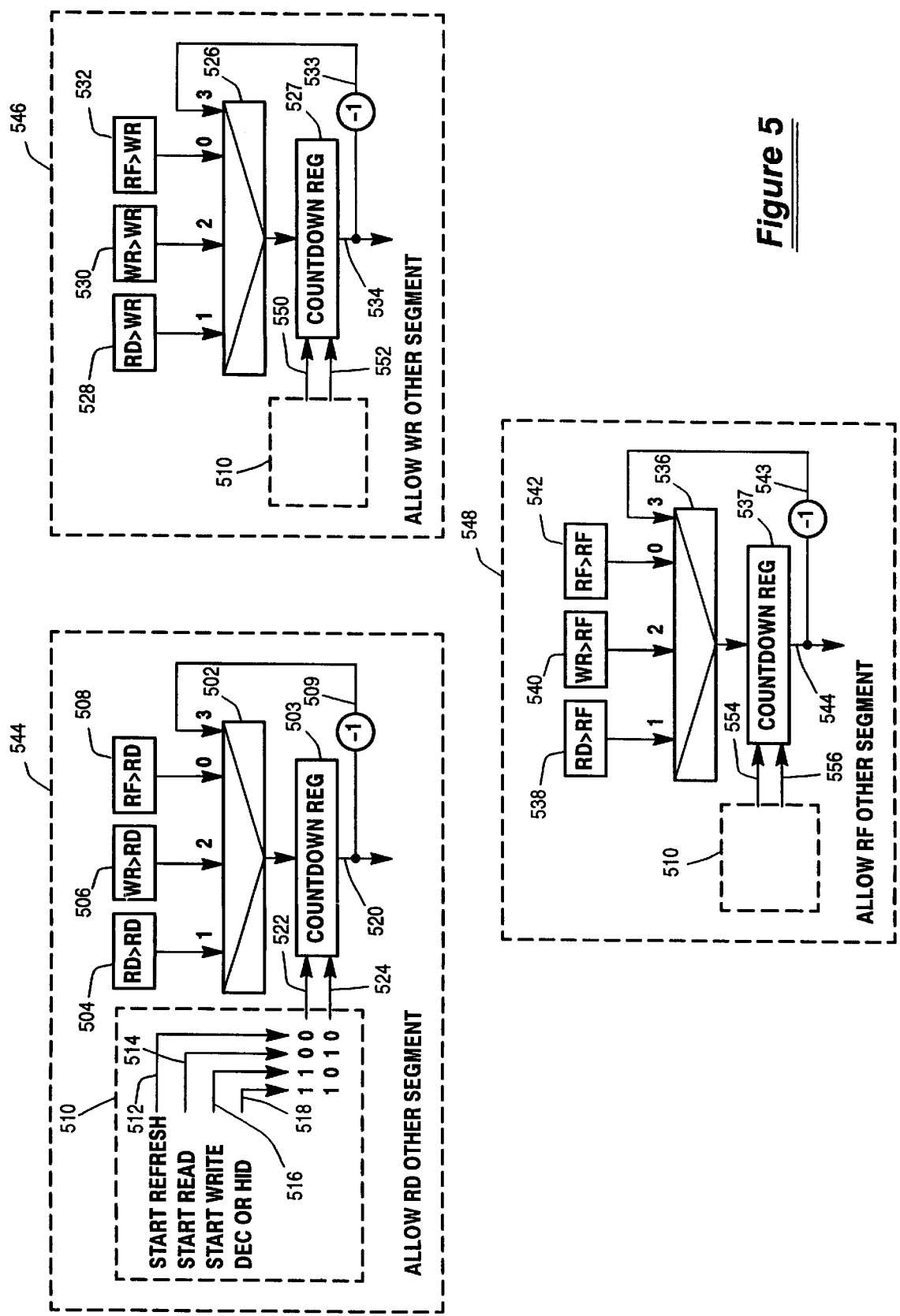
FIG. 5 is a block diagram depicting a set of allow mode signal generators that comprise one control segment according to a preferred embodiment of the present invention.

The allow mode countdown registers and their associated control logic (hereinafter referred to as 'allow mode signal generators') according to one embodiment of the present invention will now be described with reference to FIG. 5. In FIG. 5 the allow mode signal generators shown corresponds with the example of the DRAM controller 310 as depicted in FIG. 3. In addition, FIG. 5 depicts a set of such allow mode signal generators that comprise one control segment, such as the control segment 311a. It should be appreciated that the other control segment 311b comprises a complementary set of allow mode signal generators that function in a similar fashion as described below.

Accordingly, in this example embodiment, the control segment 311a comprises three allow mode signal generators: an allow read signal generator 544, an allow write signal generator 546 and an allow refresh signal generator 548. Each allow mode signal generator provides an allow signal to the other control segment 311b. For example, the allow read signal generator 544 provides an allow read signal 520 to the control segment 311b. This indicates to the control segment 311b that a read sequence can begin therein. Similarly, the allow write signal generator 546 provides an allow write signal 534 to the control segment 311b, indicating that a write sequence can begin therein. Likewise, the allow refresh signal generator 548 provides an allow refresh signal 544 to the control segment 311b, indicating that a refresh sequence can begin therein.

The allow read mode signal generator 544 comprises a countdown register 503 and a multiplexor 502, and a controller 510. The controller 510 controls the mode of operation of the countdown register 503, via the control inputs 522 and 524. The different modes of operation of the countdown register 503 is depicted by the 4 inputs 504, 506, 508, and 509 to the multiplexer 502. Depending on the desired mode of operation, the controller 510 provides a different value on the control inputs 522 and 524, causing one of the 4 multiplexer inputs 504, 506, 508 or 509 to be gated by the multiplexer 502 into the countdown register 504.

As will be described below, the first three inputs 504, 506, and 508 represent a mode of operation where the value within one of the three registers, the read register 504, the write register 506 or the refresh register 508 is loaded into the countdown register 503. The decrement input 509 represents a mode of operation where the value within the countdown register 503 is decremented by a value of 1. In addition, if a value of 0 already exists within the countdown register 503 a decrement is not performed and the 0 value persists in the countdown register 503. This function is depicted by the multiplexer input 509 which originates from the countdown register 503. Note that various methods may be used to implement specific embodiments of the countdown register and its associated modes of operation as disclosed herein. Such methods will be apparent to those skilled in the relevant art(s).

Thus, the countdown register 503 performs 4 modes of operation, depending on the value 510 that appears on the control input lines 522 and 524. The 4 modes of operation are: a start refresh mode 512; a start read mode 514; a start write mode 516; and a decrement or hold mode 518. Note that the numbers that appear next to the input arrow heads depicted for the inputs 504, 506, 508, and 509, represent with the control values (as depicted by the controller 510) used in this example to gate the corresponding input into the countdown register 503. The other two allow mode signal generators 546 and 548 function in a similar fashion.

For example, the allow write mode signal generator 546 comprises a countdown register 527. The multiplexor 526 is coupled with 4 inputs 528, 530 and 532, and 533 and is controlled by the controller 510, via the two input control lines 550 and 552. As depicted by the controller 510, the allow write mode countdown register 527 can be operated in 4 modes of operation: a start refresh 512; a start read 514; a start write 516; and a decrement or hold 518 mode of operation.

Similarly, the allow refresh mode signal generator 548 comprises a countdown register 537, a multiplexor 536 and a controller 510. The multiplexor device 536 is coupled with 4 inputs 538, 540, 542, and 543 and is controlled by the controller 510, via the two input control lines 554 and 556. As depicted by the controller 510, the allow refresh countdown register 537 can be operated in 4 modes of operation: a start refresh 512; a start read 514; a start write 516; and a decrement or hold 518 mode of operation.

It should be appreciated that each allow mode signal generator 544, 546 and 548 all contain similar elements and function in a similar fashion. Accordingly, a detailed description of the allow read mode signal generator 544 is provided as an example so that the principles disclosed herein can be applied to the other allow mode signal generators 546 and 548. Similarly, as stated, a second set of allow mode signal generators is located in the second control segment 311b. This second set of allow mode signal generators (not shown) comprise similar elements and function in a similar fashion as the set of allow mode signal generators as presented in FIG. 5. As such, the principles disclosed herein can also be applied to the second set of allow mode signal generators in the control segment 311b.

Referring now to the allow read mode signal generator 544, when the input control lines 522 and 524 contain the value of '00' a start refresh mode 512 operation is performed. During a start refresh mode of operation, the programmable value contained in the refresh mode register 508 is loaded into the countdown register 503. When the input control lines 522 and 524 contain the value of '01' a start read mode 512 of operation is performed. During a start read mode of operation, the programmable value contained in the read mode register 504 is loaded into the countdown register 503. When the input control lines 522 and 524 contain a value of '10' a start write mode 512 of operation is performed. During a start write mode of operation the programmable value contained in the write mode register 506 is loaded into the countdown register 503. Note that all the modes of operations take place synchronously with a system clock (not shown). In other words, the particular mode of operation represented by the values contained on the input control lines 522 and 524 will occur upon the next pulse of the system clock.

All of the preceding start mode operations take place in each allow mode signal generator 544, 546 and 548, whenever a control sequence begins in the local segment. For example, when the control segment 311a begins a refresh operation on the DRAM Segment 312a, the start refresh mode of operation 512 is performed in each allow mode signal generator 544, 546 and 548. Likewise, when the control segment 311 a begins a read operation on the DRAM Segment 312a, the start read mode of operation 514 is performed. Similarly, when the control segment 311a begins a write operation on the DRAM Segment 312a, the start write mode of operation 516 is performed.

Thus, again using the allow read mode signal generator as an example, upon each control sequence beginning within the control segment 311a, a programmable value from one of the three mode registers 504, 506, or 508 is loaded into the allow read countdown register 503. The selection of which programmable value is loaded into the allow read countdown register 503 depends upon the type of sequence being started in the local control segment 31 1a.

Each programmable value represents the number of clock cycles that must occur between the beginning of the particular control sequence being started in the control segment 311a and a read operation in the control segment 311b.

For example, the programmable value contained in the read register 504 is a value that represents the number of clock cycles that must elapse between the start of a read operation in control segment 311a and a read operation in the control segment 311b. Likewise the programmable value contained in the write register 506 is a value that represents the number of clock cycles that must elapse between the start of a write operation in control segment 311a and a read operation in the control segment 311b. Similarly, the programmable value contained in the refresh register 508 is a value that represents the number of clock cycles that must elapse between the start of a refresh operation in control segment 311a and a read operation in the control segment 311b.

As previously stated, the programmable values that are used in specific implementations of the present invention are determined by examining the timing parameters of particular memory devices. Typically such determination is performed with the use of a series of timing diagrams as previously described. In any case, the determination of such programmable values will be apparent to persons skilled in the relevant art(s).

When the input control lines 522 and 524 contain the value of '11', the value in the shift register is decremented by one (i.e. counts down), upon the next pulse of the system clock. However, when a value of zero is reached within the countdown register, that value is held and does not change upon subsequent pulses of the system clock. As previously stated, the signal represented by the value contained in the countdown register is used as an allow signal to the other segment, such as the allow read signal 520. A non-zero value within the countdown register 503 indicates to the other segment that a read operation should not begin therein. Conversely, a value of zero within the countdown register 503 indicates to the other segment that a read operation can begin therein.

Many other variations of embodiments and implementations of the present invention are possible without departing from the principles disclosed herein. While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A programmable memory controller comprising:

a complementary pair of memory control segments, A and B coupled to receive overlapping requests for access to a corresponding complementary memory segment; each said control segment having individual sets of address and control lines coupled to one of a corresponding pair of complementary segments;

a common data bus shared by said control segments coupled to said complementary memory segments;

a plurality of allow mode signal generators within each of said control segments A and B coupled to receive said overlapping request for access; and each allow mode signal generator providing programmed delayed or non-delayed allow mode signals coupled to start an overlapping sequence of operations in the other of said control segments B or A.

2. The programmable memory controller of claim 1, wherein each allow mode signal generator within a complementary memory control segment comprises:

a programmable count down register capable of storing a predeterminable value;

a plurality of allow mode registers each comprising a mode of operation value;

a multiplexer coupled between said plurality of allow mode registers and said countdown register; and a controller coupled to said multiplexer synchronized with a system clock for providing either a select signal for selecting one of said plurality of programmable values to be loaded into said countdown register, or a count signal for operating on said stored value within said countdown register.

3. The programmable memory controller of claim 2, wherein said controller provides said select signal at the beginning of a specific control sequence within said local control segment, and provides said count signal when not at the beginning of said specific control sequence.

4. The programmable memory controller of claim 3, wherein said count signal causes said stored value to be decremented one except when said stored value is equal to zero.

5. The programmable memory controller of claim 4, wherein a value of zero within each said countdown register is coupled to and used by said complementary control segment to indicate that a particular control sequence can begin therein.

6. The programmable memory controller of claim 5, wherein each said countdown register in said control segment generates an allow signal for a different control sequence in said complementary control segment.

7. The programmable memory controller of claim 6, wherein each said programmable countdown value defines a number of clock cycles between said specific control sequence and a following control sequence.

8. A programmable memory controller comprising:

complementary control segments each coupled to control a memory device having multiple segments;

each control segments having individual control and address lines coupled to one of said memory segments, and a plurality of allow mode signal generators within each said control segments, each generator having a plurality of programmable values, wherein each programmable value defines when a particular control sequence is allowed to begin in the other of said complementary control segments.

9. The programmable memory controller of claim 8, wherein each said allow mode signal generator an allow mode signal to said other control segment indicating when said particular control sequence is allowed to begin therein.

10. The programmable memory controller of claim 9, wherein each said allow mode signal generator within a local control segment comprises:

a synchronous countdown register capable of storing a countdown value used to generate said allow mode signal for said another control segment;

a multiplexer coupled with said countdown register;

a plurality of mode registers coupled with said multiplexer, each associated with a specific control sequence in said local control segment and contains one said programmable value that defines a time between said specific control sequence and said particular control sequence; and a controller coupled with said multiplexer wherein said controller selectively loads said programmable value corresponding with said specific control sequence at the beginning of said specific control sequence, and decrements said countdown value when not at the beginning of said specific control sequence.

11. A programmable memory controller comprising:

a complementary pair of memory segments coupled to receive overlapping memory request comprising first and second control segments;

said first control segment being coupled to a first memory segment via a first set of address and control lines;

said first control segment comprising programmable allow signal generation means for generating first allow control sequence signals;

said second control segments being coupled to a second memory segment via a second set of address and control lines, and providing overlapping control sequences to said second memory segments according to said second memory segments according to said allow control sequence signals from said first control segment.

12. The programmable memory controller of claim 11, wherein said programmable allow signal generation means comprises:

register storing means for storing a plurality of programmable countdown values;

a synchronous storage and counting means;

gating means coupled between said storing means and said synchronous means for gating one of said programmable countdown values to synchronous means; and controlling means coupled to said gating means for selecting between said plurality of programmable countdown values at the beginning of a control sequence within said first control segment, and for controlling said synchronous means.

13. The programmable memory controller of claim 12, wherein said synchronous means comprises a plurality of countdown registers, each capable of storing a countdown value that is used to generate said allow control sequence signal for a particular control sequence to begin in said second segment.

14. The programmable memory controller of claim 12, wherein said register storing means comprises a plurality of mode registers, each having one of said programmable countdown values that represents a specific control sequence associated with said first segment.

15. The programmable memory controller of claim 12, wherein said gating means comprises a multiplexer.

16. The programmable memory controller of claim 12, wherein said controlling means comprises input control signals coupled to said gating means, said input control signals provides either a select signal for selecting one of said plurality of programmable counter values to be gated into said synchronous means, or a count signal for decrementing operating on a stored value stored in said synchronous means.

17. The programmable memory controller of claim 16, wherein said controller provides said select signal at the beginning of a specific control sequence within said first control segment, and provides said count signal when not at the beginning of said specific control sequence.

18. The programmable memory controller of claim 16, wherein said count signal causes said stored value to be decremented until said stored value is equal to zero.

19. The programmable memory controller of claim 18, wherein a stored value of zero indicates to said second control segment that a particular control sequence can begin therein.

* * * * *